United States Patent [19]

Krouglicof et al.

[11] Patent Number: 4,649,504
[45] Date of Patent: Mar. 10, 1987

[54] OPTICAL POSITION AND ORIENTATION MEASUREMENT TECHNIQUES

[75] Inventors: Nicholas Krouglicof, Montreal West; Gordon M. McKinnon, Montreal; Jaroslav Svoboda, Hudson Heights, all of Canada

[73] Assignee: CAE Electronics, Ltd., Montreal, Canada

[21] Appl. No.: 613,063

[22] Filed: May 22, 1984

[51] Int. Cl.⁴ .................. G06G 7/48; G09G 3/02; G01B 11/26
[52] U.S. Cl. .................. 364/559; 364/578; 340/705; 340/980; 356/141
[58] Field of Search .............. 364/559, 578; 340/705, 340/712, 709, 825.19, 980; 356/141, 152

[56] References Cited

U.S. PATENT DOCUMENTS

| | | |
|---|---|---|
| 3,375,375 | 3/1968 | Abbey et al. |
| 3,916,094 | 10/1975 | Marrone ................................ 178/6 |
| 3,917,412 | 11/1975 | Stoutmeyer et al. .............. 356/152 |
| 4,028,725 | 6/1977 | Lewis ............................... 356/152 X |
| 4,048,653 | 9/1977 | Spooner ............................. 358/104 |
| 4,092,072 | 5/1978 | Ellis ................................... 356/152 |
| 4,111,555 | 9/1978 | Ellis ................................... 356/141 |
| 4,193,689 | 3/1980 | Reymond et al. .................. 356/152 |
| 4,209,254 | 6/1980 | Reymond et al. .................. 356/152 |
| 4,209,255 | 6/1980 | Heynau et al. ..................... 356/152 |
| 4,315,240 | 2/1982 | Spooner ............................ 340/27 R |
| 4,315,241 | 2/1982 | Spooner ............................ 340/27 R |
| 4,333,154 | 6/1982 | Devaud et al. ..................... 364/559 |
| 4,340,878 | 7/1982 | Spooner et al. ................... 340/27 R |
| 4,347,507 | 8/1982 | Spooner ............................. 340/705 |
| 4,347,508 | 8/1982 | Spooner ............................. 340/705 |
| 4,348,185 | 9/1982 | Breglia et al. ....................... 434/43 |
| 4,348,186 | 9/1982 | Harvey et al. ...................... 434/44 |
| 4,349,815 | 9/1982 | Spooner ............................. 340/705 |
| 4,419,012 | 12/1983 | Stephenson et al. .............. 356/141 |
| 4,446,480 | 5/1984 | Breglia et al. ...................... 358/104 |
| 4,475,814 | 10/1984 | Marche ........................... 356/152 X |

*Primary Examiner*—Parshotam S. Lall
*Assistant Examiner*—Joseph L. Dixon
*Attorney, Agent, or Firm*—Schwartz, Jeffery, Schwaab, Mack, Blumenthal & Evans

[57] ABSTRACT

A non-contact sensing system for monitoring the position and orientation of a rigid body in space having at least three distinct point light sources mounted on the rigid body. At least two position sensor heads are fixedly mounted within detection range of light from the light sources, each position sensor head having a position sensitive detector. The lights are illuminated one at a time and in sequential arrangement and a processor computes the position in three-dimensional space of an illuminated light source with data provided simultaneously by both position sensitive detectors. The processor means also computes the position of the object in all six degrees of freedom using the three-dimensional positional data of all three light sources.

8 Claims, 4 Drawing Figures

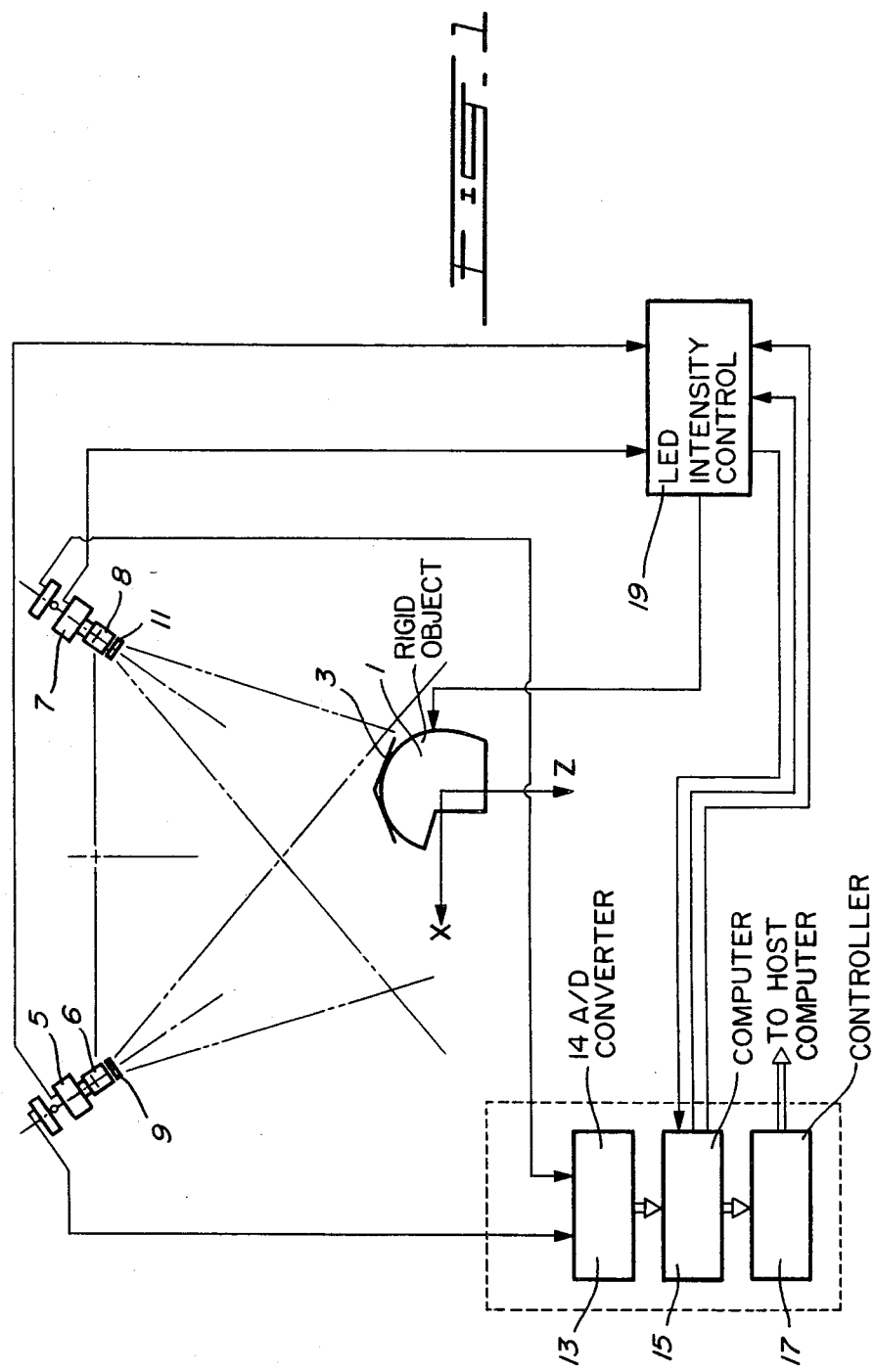

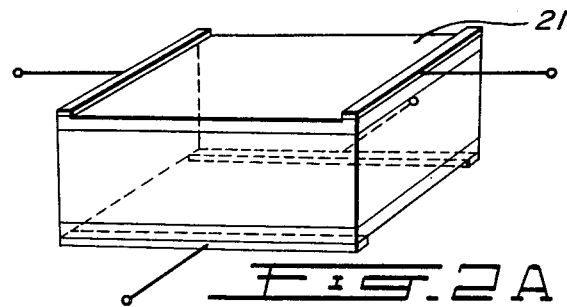
FIG. 2A
FIG. 2B
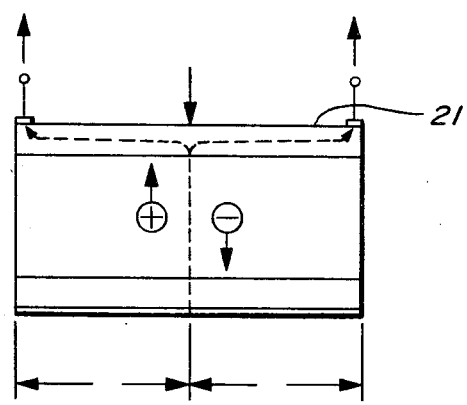
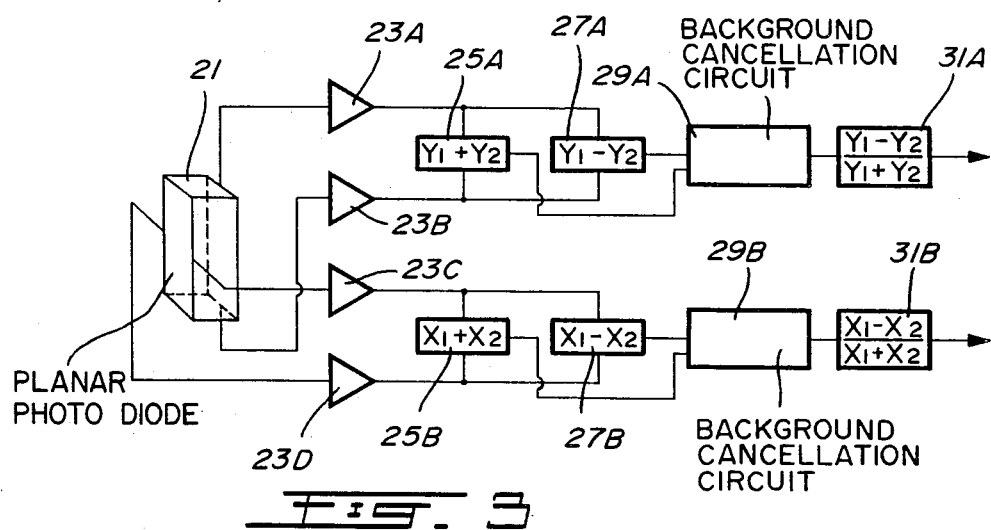
FIG. 3

OPTICAL POSITION AND ORIENTATION MEASUREMENT TECHNIQUES

BACKGROUND OF INVENTION

1. Field of the Invention

The invention relates to a non-contact sensing system for monitoring the position and orientation of a rigid body in space. More specifically, the invention relates to such a system which can monitor the position and orientation of a pilot's helmet within the cockpit of a high performance tactical aircraft simulator.

2. Description of Prior Art

In order for aircraft simulators to provide a realistic simulation of aircraft flight, it is necessary to display a simulated surrounding environment to the simulator pilot. In currently available flight simulators, the displays are provided on the windscreens in the cockpit areas. These systems require one CRT for each such windscreen. With such a system, images of equal quality must be generated in each CRT regardless of where the pilot is looking. This is costly both in terms of hardware and computer time.

However, by projecting the image directly onto the visor of a pilot's helmet, a significant cost saving can be realized since the field of view is greatly reduced so that both the quality of the image (i.e. resolution) and the frame rate can be reduced. The field of view would be head slaved in order to provide an image which is instantaneously limited to the pilot's viewing area but which can be redirected to permit the pilot to "look" in any direction. It is also contemplated to track eye position or point of regard and provide a higher resolution image slaved to the eye's foveal area. In such a system, the pilot would perceive high resolution imagery wherever he looks. However, at any instant, the system is only required to produce high resolution images over a 15° cone.

One of the difficulties associated with the use of helmet mounted visor displays is the maintenance of image stability. In order for the computer generated image to appear stationary as the pilot moves his head, the position of the pilot's helmet must be known relative to the simulator's fixed axis. This position is defined by three translation parameters (X, Y, Z) and three rotation parameters (Euler Angles). This information is also necessary in order to align the computer generated image with the frame of the windscreen. Thus, a (helmet) position sensing system is needed.

Currently available non-contact position sensing systems comprise a magnetic system as described in Raab, F. H., Blood, E. B., Steiner, T. O., and Jones, H. R., "Magnetic Position and Orientation Tracking System", *IEEE Transactions on Aerospace and Electronic Systems*, Vol. AES-15, No. 5, September 1979, pp. 709-718, and a V-slit system as described in Lewis, C. J. G., "Helmet Mounted Display and Sight Development", *Proceedings of the American Helicopter Society*, May 1979, pp. 79.17.1-79.17.13. However, both of these systems fail to meet required specifications.

SUMMARY OF INVENTION

It is therefore an object of the invention to provide a non-contact position sensing system which meets the required specifications.

In accordance with the invention, the system monitors the position orientation of a body in space which has at least three distinct point light sources mounted thereon. The system includes at least two position sensor heads each of which includes a position sensitive detector.

BRIEF DESCRIPTION OF DRAWINGS

The invention will be better understood by an examination of the following description, together with the accompanying drawings, in which:

FIG. 1 is a schematic diagram of the inventive system;

FIG. 2A is a schematic diagram of a position sensitive detector;

FIG. 2B is an electron flow diagram of the position sensitive detector; and

FIG. 3 illustrates an analog position processing circuit for processing data of the position sensitive detector.

DESCRIPTION OF PREFERRED EMBODIMENTS

Referring to FIG. 1, 1 is a rigid object in space whose position and orientation must be monitored. In the particular embodiment illustrated, 1 is a helmet which is worn by a pilot in the cockpit of a high performance tactical aircraft simulator.

A mounting plate 3 carries at least three point light sources, preferably LED's, and the mounting plate is mounted on the helmet. Obviously, the LED's could be mounted directly on the helmet instead of on a mounting plate.

Fixedly mounted in the cockpit are position sensor heads 5 and 7. The sensor heads are mounted within detection range of the light from all of the LEDs, and are directed at the LEDs. Camera lenses 6 and 8 are disposed in front of the position sensor heads for reasons explained below.

As the position sensor head is sensitive to a wide spectrum of light, bandpass interference filters, illustrated schematically at 9 and 11, are placed in front of each lens to minimize the effect of ambient light. The filters are spectrally matched to the light of the LEDs.

Each position sensor head includes a position sensitive detector which will be discussed in association with FIGS. 2 and 3 below.

The output of each position sensor head is fed to an analog-to-digital converter 13, and the digital data is then fed to a computer 15. One output of 15 is fed to a controller 17 which provides a host computer with the position and orientation information of the helmet as computed in the computer.

As is known, and will be discussed below, at least three LEDs coupled with two position sensor heads are needed to determine the position and orientation of the helmet in all six degrees of freedom. In accordance with the invention, the LEDs are turned on one at a time, and in sequential arrangement, and the three dimensional position of each LED is determined by a triangulation scheme using the data from the two position sensor heads.

It is also necessary to maintain a constant light intensity of each LED, when it is turned on, regardless of the position or orientation of the helmet.

LED controller 19 maintains a constant light intensity of the turned on LEDs and also turns on the LEDs one at a time and in sequential arrangement. As can be seen, the controller 19 is controlled by the computer 15 which determines the required LED current to maintain a constant light intensity as a function of the position of the helmet. The computer also selects the particular LED to be turned on, and takes into account the fact that it was this turned on LED when computing the position and orientation of the helmet.

Turning now to FIGS. 2A and 2B, as can be seen, the position sensitive detector is a planar photodiode 21 with very uniform resistive layers formed over both the top and bottom surfaces. The camera lenses 6 and 8 are used to focus the infrared light from the LEDs onto the active area of this detector.

This results in the generation of electron-hole pairs in the depletion layer directly under the light spot. The electrons migrate to the N-layer where they are channelled between two electrodes. Since the N-layer has a uniform resistivity, the current flowing to the pair of Y electrodes will depend on its distance from the point of incidence of the light.

The same basic principles apply to the P-layer, i.e., holes will migrate to the P-layer. The current signals are then processed using, for example, the circuitry illustrated in FIG. 3.

Turning now to FIG. 3, the processing circuit comprises preamps 23 connected to each one of the X and Y electrode pairs. Adders 25A add the contents of the X electrodes and adders 25B add the contents of the Y electrodes. Subtractors 27A subtract the contents of the X electrodes and subtractors 27B subtract the contents of the Y electrodes. The outputs of 25A and 27A are fed to background cancellation circuits 29A and the outputs of 25B and 27B are fed to background cancellation circuits 29B, and the outputs of cancellation circuits 29A and 29B are fed to dividers 31A and 31B, respectively.

With filtering, as per filters 9 and 11, the resolution of the position sensor head can be as high as 0.02% of full scale. The filtering is necessary because of the high frequency jitter which is normally present. With the dynamic performance of the inventive device, it can be used for vibration measurements at frequencies of up to 50 kHz.

It is necessary to use two sensors viewing the same LED patterns (at least three LEDs) to uniquely determine the helmet position in all six degrees of freedom. The image on the sensitive area of the detector of each LED is a two-dimensional perspective projection of an LED moving in three-dimensional space. Consequently, the three-dimensional position of the LED cannot be recovered from its image coordinates. At best, only the direction of the vector between the LED and the sensor can be determined. If each LED is viewed from two locations, a triangulation scheme can be used to compute the position of each LED in three dimensions. Therefore, with a minimum of three LEDs and two sensors, the helmet position can be uniquely determined in all six degrees of freedom.

The addition of more LEDs results in an overdetermined system of equations which can increase the accuracy of the measurement through the application of least squares analysis as taught in Roach, J. W. and Aggarwal, J. K., "Determining the Movement of Objects from a Sequence of Images", *IEEE Transactions on Pattern Analysis and Machine Intelligence*, Vol. PAMI-2, No. 6, November 1980, pp. 554–562.

Data processing tasks for the optical helmet position sensing systems are accomplished, in one embodiment, by an INTEL iSBC 86/12 single board computer. This Board's capabilities are summarized as follows:

| | |
|---|---|
| CPU | 8086 |
| CPU SPEED | 5 MHz |
| RAM (BASE BOARD) | 32K |
| EPROM (BASE BOARD) | 16K |
| SERIAL I/O | 1 |
| PARALLEL I/O LINES | 24 |
| TIMERS | 2 |
| INTERRUPTS | 8 |

In order to determine the helmet position and orientation, a large number of floating point operations must be performed. Several trigometric functions are also required. The floating point operations can be performed by the 8087 Numeric Processor. The 8087 has the ability to perform the high speed floating point mathematics required in complex control algorithms.

Helmet position and orientation data are, as abovementioned, transferred from the computer to a host computer. In the preferred embodiment, the transfer from the INTEL 86/12 is to a SEL 32/55 host computer. In this embodiment, the control 17 comprises a MULTIBUS-SELBUS Controller (MBSEL). The MBSEL board is an intelligent DMA controller which communicates with the SELBUS via a high speed data interface board (HSD). Because of the 86/12 board's dual port RAM, the MBSEL can access the position and orientation data directly via the MULTIBUS. Data transfers are transparent to both the SEL and 8086 processors.

Again, in the particular embodiment, a custom-built analog board 13 is used to read the output signals from the position sensor heads and to convert them into digital signals. In order to minimize the conversion time, two independent 14-bit analog-to-digital converters were included on this board.

Methods for the mathematical analysis of the data are taught in, for example, Lenox, J. B., *Six Degree of Freedom Human Eyeball Movement Analysis Involving Steriometric Techniques*, Ph.D. Thesis, Stanford University, Stanford, Calif., 1976, Schut, G. H., "On Exact Linear Equations for the Computation of the Rotational Elements of Absolute Orientation", *Photogrammetria*, Vol. 17, No. 1, 1960, pp. 34–37, Schut, G. H., "Formation of Strips from Independent Models", AP-PR 36, NRC-9695, Division of Physics, National Research Council of Canada, Ottawa, July 1967, and Thompson, E. H., "An Exact Linear Solution of the Problem of Absolute Orientation", *Photogrammetria*, Vol. 15, No. 4, 1959, pp. 163–179.

In comparison with other non-contact position sensing systems, the inventive system offers high resolution and speed at a relatively low cost. These features suggest other possible applications of the inventive system in the areas of robot vision, industrial control, kinesiology and laboratory instrumentation. Accordingly, the inventive system has uses outside of the environment as described above in the preferred embodiment.

Although a particular embodiment has been described, this was for the purpose of illustrating, but not limiting, the invention. Various modifications, which will come readily to the mind of one skilled in the art, are within the scope of the invention as defined in the appended claims.

We claim:

1. A non-contact sensing system for monitoring the position and orientation of a rigid body in space wherein at least three distinct point light sources are mounted on said body for movement therewith;

said system comprising:

at least two position sensor heads fixedly mounted within detection range of light from all of said light sources, said position sensor heads being directed at said light sources;

wherein each position sensor head includes a position sensitive detector;

means for turning said light sources on one at a time and in a sequential arrangement;

processor means;

said position sensitive detector outputs being connected to the input of said processor means;

said processor means computing the position in three-dimensional space of a turned on light source with data concerning said turned on light source provided simultaneously by both position sensitive detectors;

said processor means also computing the position of said object in all six degrees of freedom using the three-dimensional positional data of all three light sources;

said processor means further selecting which light source is to be turned on and driving said means for turning said light source on, whereby said computer has data concerning which light source is turned on at any time.

2. A system as defined in claim 1 wherein said position sensitive detectors provide analog signals at their outputs;

analog-to-digital conversion means between the outputs of said position sensitive detectors and the input of said processing means whereby to convert said analog signals into digital signals for use in said processor means.

3. A system as defined in claim 2 and including means for varying power to said light sources whereby to maintain a constant light intensity from each light source, when the light source is turned on, at said position sensitive detectors regardless of the position and orientation of said rigid body.

4. A system as defined in claim 3 and further including lens means on each position sensor head whereby to focus light from said light sources onto a respective position sensitive detector.

5. A system as defined in claim 4 and including filter means on each lens, the filter means being spectrally matched to the light sources.

6. A system as defined in claim 5 wherein said rigid body comprises a pilot's helmet within the cockpit of an aircraft simulator;

said position sensor heads being mounted in the interior of said simulator.

7. A system as defined in claim 6 wherein said light sources comprise LEDs, said means for varying the power to said light sources comprising means for varying the current to said LEDs.

8. A non-contact method for monitoring the position and orientation of a rigid body in space having at least three distinct point light sources mounted thereon for movement therewith;

at least two position sensor heads fixedly mounted within detection range of light from said light sources, each position sensor head including a position sensitive detector, said position sensor heads being directed at said light sources;

and a processor means;

said method comprising;

turning on said light sources one at a time and in sequential arrangement;

computing, by said processor means, the position in three-dimensional space of a turned on light source with data concerning said turned on light source provided simultaneously by both position sensitive detectors to said processor means;

computing the position of said object in all six degrees of freedom using the three-dimensional positional data of all three light sources.

* * * * *